United States Patent
Hosogi et al.

(10) Patent No.: US 10,860,577 B2
(45) Date of Patent: Dec. 8, 2020

(54) SEARCH PROCESSING SYSTEM AND METHOD FOR PROCESSING SEARCH REQUESTS INVOLVING DATA TRANSFER AMOUNT UNKNOWN TO HOST

(71) Applicant: HITACHI, LTD., Tokyo (JP)

(72) Inventors: Koji Hosogi, Tokyo (JP); Akifumi Suzuki, Tokyo (JP); Kazuyoshi Serizawa, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 415 days.

(21) Appl. No.: 15/754,808

(22) PCT Filed: Dec. 24, 2015

(86) PCT No.: PCT/JP2015/086111
§ 371 (c)(1),
(2) Date: Feb. 23, 2018

(87) PCT Pub. No.: WO2017/109911
PCT Pub. Date: Jun. 29, 2017

(65) Prior Publication Data
US 2018/0239799 A1    Aug. 23, 2018

(51) Int. Cl.
*G06F 16/2453* (2019.01)
*G06F 16/951* (2019.01)

(52) U.S. Cl.
CPC ...... *G06F 16/24532* (2019.01); *G06F 16/951* (2019.01)

(58) Field of Classification Search
CPC .......................... G06F 16/24532; G06F 16/951
See application file for complete search history.

(56) References Cited

U.S. PATENT DOCUMENTS 5,819,273 A * 10/1998 Vora ...................... G06F 16/338
6,182,061 B1 * 1/2001 Matsuzawa ....... G06F 16/24556
707/737

(Continued)

FOREIGN PATENT DOCUMENTS

JP    07-028836 A    1/1995
JP    2010-152435 A    7/2010

OTHER PUBLICATIONS

"Fast, Energy Efficient Scan inside Flash Memory SSDs", ADMS (2011).

(Continued)

*Primary Examiner* — Cam Y T Truong
(74) *Attorney, Agent, or Firm* — Volpe Koenig

(57) ABSTRACT

An intermediate device is disposed between a host and a search target. Search requests of m-multiplicity (requests involving a data transfer amount that is unknown to the host) for at least one among n-processes (n is an integer equal to or more than 1) to be executed by the host are issued as requests from the host to the intermediate device. A temporary area associated with the search requests is allocated in the host. For each of the search requests, the intermediate device recognizes a hit data volume in accordance with the search request within a search scope. For each of the search, the hit data is written in an area of the temporary area that corresponds to a write destination address. The write destination address is updated for each of the search requests on the basis of the recognized hit data volume.

12 Claims, 10 Drawing Sheets

(56) References Cited

U.S. PATENT DOCUMENTS

| | | | |
|---|---|---|---|
| 8,819,335 B1 | 8/2014 | Salessi et al. | |
| 2004/0148317 A1* | 7/2004 | Sundararajan | G06F 16/275 |
| 2008/0010411 A1* | 1/2008 | Yang | G06F 12/0866 |
| | | | 711/122 |
| 2010/0211577 A1* | 8/2010 | Shimizu | G06F 16/24537 |
| | | | 707/752 |

OTHER PUBLICATIONS

Ibex: "An Intelligent Storage Engine with Support for Advantage SQL Offloading", VLDB, vol. 7 Issue 11, Jul. 2014.
International Search Report for WO 2017/109911, dated Apr. 5, 2016.

* cited by examiner

FIG. 1

Table name: TABLE1

| name  | shape    | diameter | height | weight |
|-------|----------|----------|--------|--------|
| NAME1 | sphere   | 10       | 10     | 10     |
| NAME2 | cylinder | 8        | 12     | 5      |
| NAME3 | cone     | 5        | 14     | 6      |
| NAME4 | cone     | 7        | 8      | 7      |
| NAME5 | cylinder | 7        | 6      | 8      |
| NAME6 | sphere   | 9        | 9      | 8      |

FIG. 2

```
SELECT    *
FROM      TABLE1
WHERE     shape ='sphere'
AND       weight > 9
```

SEARCH PROCESSING SYSTEM AND METHOD FOR PROCESSING SEARCH REQUESTS INVOLVING DATA TRANSFER AMOUNT UNKNOWN TO HOST

TECHNICAL FIELD

The present invention generally relates to processes for requests involving a data transfer amount that is unknown to the host.

BACKGROUND ART

Spread of social media and utilization of IT (Information Technology) in financial, distribution, and communication sectors and the like have rapidly increased the amount of data collected and accumulated on a daily basis. With such increase, big data analysis, which integrally analyzes enormous data (data collected from sensors installed in factories and the like, for example) and a large amount of content, is one of the trends. Typical applications of big data analysis include trend prediction through analysis of social media data, equipment failure prediction and inventory management through analysis of big data collected from industrial equipment and IT systems (e.g., computer systems), etc.

A general system that executes such big data analysis includes a host that performs data analysis, and a storage that holds analysis target data. A database analysis process that uses a relational database is adopted therefor.

The relational database includes tables that are two-dimensional data arrays each made up of columns, which are called schemas, and rows which are stores actual data items. Database operations are performed for the two-dimensionally structured database using a query language. One of the database operations is a database search. An example thereof is a search that extracts rows having content value of "10000" or higher from among rows having a column whose schema is "price".

To speedup the database search process, various techniques are adopted. For example, instead of a storage that includes a relatively low-speed storage device (e.g., HDD (Hard Disk Drive)), a storage that includes a relatively high-speed storage device (e.g., SSD (Solid State Drive) is adopted. According to a technique called an in-memory database, data in a relatively low-speed storage device is preliminarily copied in a high-speed memory (e.g., DRAM (Dynamic Random Access Memory) disposed inside or outside of a host) disposed near to a processor of the host, and a search process is performed for the high-speed memory, thereby improving the performance.

It can also be considered that an off-loading technique described in NPLs 1 and 2 is adopted. According to this technique, a database search process, which has conventionally been processed in a host, is off-loaded to an FPGA (Field-Programmable Gate Array) or a control CPU in an SSD storage. According to this technique, in a process of referring to and searching the entire database, such as of all records search, the transfer bottleneck between the storage and the host can be avoided.

It can be also considered that an off-loading technique described in PTL 1 may be adopted. According to this technique, the Map-Reduction operation, which is one function of Hadoop (Registered trademark), is off-loaded to the SSD storage. A large capacity database is distributed to multiple storages, and can be processed in parallel by a server that includes node clusters.

As described above, for the sake of speeding up the database search process, an SSD, which is an example of the relatively high-speed storage device, is used, the host process is off-loaded to the storage, and the parallel process, such as clustering, is adopted, thereby allowing the speed of request processing to be improved.

Here, according to the off-loading technique described in NPLs 1 and 2, search hit row data is written in a buffer area preliminarily allocated to a main memory area in a host, and the row data written in the buffer area is referred to or operated by the host, thereby completing the database search process.

CITATION LIST

Patent Literature

[PTL 1] U.S. Pat. No. 8,819,335

Non-Patent Literature

[NPL 1] "Fast, Energy Efficient Scan inside Flash Memory SSDs", ADMS (2011)
[NPL 2] Ibex: "An Intelligent Storage Engine with Support for Advantage SQL Offloading", VLDB, Volume 7 Issue 11, July 2014

SUMMARY OF INVENTION

Technical Problem

Processes for search queries are a typical example of processes for requests involving a data transfer amount that is unknown to the host. The amount of data to be found in response to a search query (search hit) is unknown at a time point when the host issues the search query. That is, the host does not recognize the data transfer amount in response to the search query.

According to the techniques described in NPLs 1 and 2, a buffer area is required to be preliminarily allocated to the main memory area in the host.

As described above, the number of search hit rows and the volumes are unknown before the search process. In cases with certain search queries, all the rows can be hit. Accordingly, the capacity of the preliminarily allocated buffer area is required to be a capacity that can store all the rows.

However, in a case where the number of actually search hit rows is small, a large free capacity can occur in the buffer area. That is, the efficiency of using the allocated buffer area is low.

Additionally, node clustering, multi-threading and the like allow the database search processes to operate in parallel even in a single host. Multiple buffer areas are required to be allocated accordingly. According to the reasons described above, the capacity of all the buffer areas is required to be a capacity that can store all the rows. Consequently, also in the case of parallel processing, with a small number of hit rows, a problem occurs in that the efficiency of using the buffer area is low.

SOLUTION TO PROBLEM

An intermediate device is disposed between a host and a search target. Search requests that are requests involving a data transfer amount unknown to the host, which executes n-processes (n is an integer equal to or more than 1), are issued as requests by the host to the intermediate device.

With respect to at least one process among n-processes, search requests of m-multiplicity are issued. Each of the search requests of m-multiplicity is a request that searches a partial search scope of search targets for hit data that satisfy a search condition. The host includes a host memory unit that is at least a memory. A target temporary area that is a temporary area associated with the search requests of m-multiplicity is allocated in the host memory unit. For each of the search requests of m-multiplicity, the intermediate device recognizes a hit data volume which is a volume of hit data in accordance with the search request within a search scope in accordance with the search request. For each of the search requests of m-multiplicity, the hit data in accordance with the search request is written in an area of the target temporary area that corresponds to a write destination address. The write destination address is updated for each of the search requests of m-multiplicity on the basis of the recognized hit data volume.

Advantageous Effects of Invention

In the search process through the process coordinated between the host and the intermediate device (the device between the host and the search target), the total amount of temporary areas of the host can be reduced.

BRIEF DESCRIPTION OF DRAWINGS

FIG. 1 shows an example of a table included in a database.
FIG. 2 shows an example of a search query.

DESCRIPTION OF EMBODIMENTS

Figure 3:
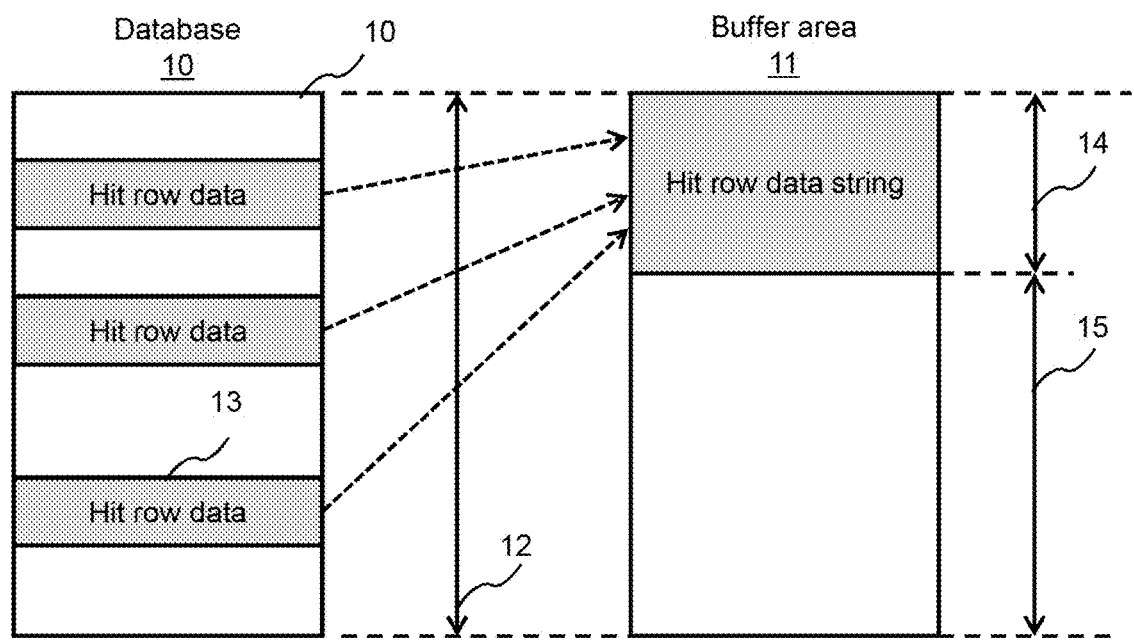
FIG. 3 is an example of a problem (a case with a single buffer area) according to a comparative example.

Hereinafter, referring to the diagrams, several embodiments are described.
In the following description, "database" is appropriately abbreviated as "DB".

In the following description, "command" is adopted as an example of a request. An example of a command is a search query.

In the following description, "bbb unit" (or bbb accelerator) is sometimes used as the subjects of sentences. These function units can be executed by a processor to perform predetermined processes using a memory and a communication port (a network I/F). Consequently, description may be made with the processor being adopted as the subject of a sentence. A processor typically includes a microprocessor (e.g., a CPU (Central Processing Unit)), and may further include dedicated hardware (e.g., an ASIC (Application Specific Integrated Circuit)) or an FPGA (Field-Programmable Gate Array)). The processes disclosed with these function units being adopted as the subjects of sentences may be configured as processes to be executed by a storage or a host server. Some or all of these function units may be realized using dedicated hardware. Various function units may be installed in respective computers by a program distribution server or a computer-readable storage medium. The various function units and the server may be installed in a single computer and executed, or installed in multiple computers and executed. The processor is an example of a control unit, and may include a hardware circuit that performs some or all processes. The program may be installed from a program source into an apparatus, such as a computer. The program source may be, for example, a program distribution server, or a computer-readable storage medium. In the case where the program source is the program distribution server, the program distribution server includes a processor (e.g., CPU), and a storage unit. The storage unit may further store a distribution program, and a program that is a distribution target. The processor of the program distribution server executes the distribution program, thereby allowing the processor of the program distribution server to distribute the program that is the distribution target to another computer. In the following description, two or more programs may be realized as one program. One program may be realized as two or more programs.

In the following description, "hit row data string" are all the hit row data items corresponding to one search query. One "hit row data item" is search hit data (corresponding to a search condition designated by a search query). The hit row data may be all data items in rows or columns, or partial data (e.g., content value (column value)).

Embodiment 1

An example of a database search process that is a target of this embodiment is described with reference to FIGS. 1 and 2.

FIG. 1 shows an example of a table included in a database.

As shown in FIG. 1, the database is configured to have a two-dimensional data structure that includes columns in the horizontal direction, and rows in the vertical direction. The top is called schemas, which mean the labels of the respective columns. In the row direction, character string, a numerical value or the like can be defined by content values (column values) for the respective schemas, with various data widths. For example, in this example, "height" schema with "name" schema of "NAME1" has a content value of "10". The table name of this database is "TABLE1". Meta information on the database (e.g., schema names, the number of schemas, the data widths of the respective schemas, and the table name) is predefined by, for example, SQL (Structured Query Language), which is a general purpose database language. The definition of the data widths of the respective schemas determines the data amount a row.

FIG. 2 shows an example of a search query.

The search query is a query in conformity with the format of SQL, which is a general purpose database language. A character string "SELECT" on the first row indicates an output format. A wildcard (*) indicates the entire row. In a case where, instead of the wildcard, a schema name (e.g., "diameter") is designated, the value for the schema is to be the output. "FROM" character string on the second row indicates the table name, and indicates that the database having the table name "TABLE1" is regarded as the target. "WHERE" character string on the third row indicates a search condition, and indicates that those having a schema name "shape" being "sphere" are regarded as search targets. "AND" character string on the fourth row indicates an additional condition to "WHERE" on the third row, and indicates that rows having the schema name "weight" being larger than "9" are regarded as search targets. According to an execution result of this search query, data on the first row, which is the row with "shape" being "sphere" and "weight" being "9" or more, is to be the output.

The database process according to this embodiment is a process related to that of narrowing down the search targets while interactively adding search queries multiple times, and is used in a process of extracting effective data in big data analysis. Hereinafter, the database search is described as a target.

According to one comparative example, as shown in FIG. 3, the data transfer amount in response to the search query is unknown to the host. Consequently, the buffer area 11 (e.g., the buffer area secured in the main memory of the host) allocated in the host has the same capacity as a search unit volume 12 designated by the search query, that is, the volume equivalent to the entire search scope according to the search query (the search unit volume 12 is sometimes the volume of the database 10, or is sometimes the volume of a part of the database 10).

However, in a normal case, an actual volume 14 that is a total volume of hit row data strings (the entire hit row data 13 that are actual hits in the search) according to the search query is typically smaller than the search unit volume 12. Consequently, a large free capacity 15 can occur.

Figure 4:
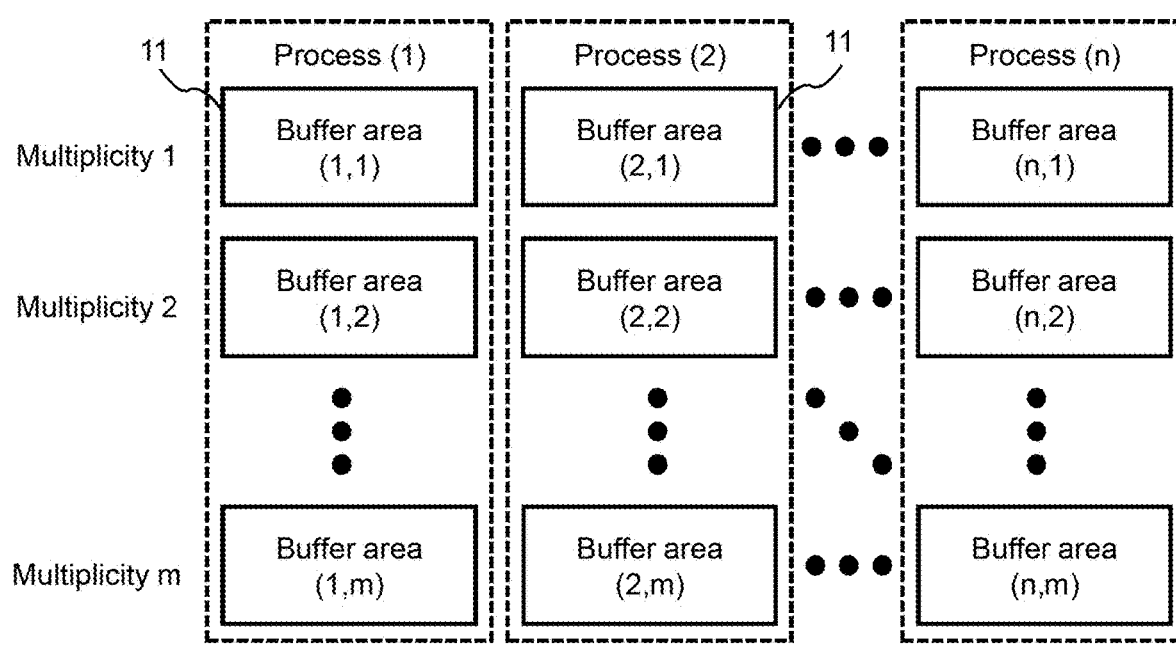
FIG. 4 is an example of a problem (a case with n×m buffer areas) according to a comparative example.

In an actual database process, for example, the database 10 is divided. The search process is then executed for each divided database in a multi-thread basis. Each process issues search queries in a multiple manner in order to improve the search process throughput. In this case, as shown in FIG. 4, buffer areas 11 are required to be allocated in the process direction and the multiplicity direction, respectively. That is, n×m buffer areas 11, which support n-processes and the m-multiplicity, are required. Note that n is an integer equal to or more than 1, and m is an integer equal to or more than 2. In FIG. 4, "buffer area (k, j)" means a buffer area that supports the k-th process (k is equal to or more than 1 and equal to or less than n), and the j-th command (j is equal to or more than 1 and equal to or less than m).

Even if a single buffer area has a small capacity, the total buffer capacity increases in proportion to the number of processes (n) and the multiplicity (m). The buffer areas corresponding to the search queries with a small number of search hit rows among the n×m buffer areas 11 can cause a large free capacity, as described with reference to FIG. 3.

In order to reduce the number of buffer areas 11, it can be considered to reduce the m-multiplicity (for example, it can be considered to adopt m=1). Accordingly, with a certain magnitude of the search unit volume 12, the time in which the response to the search query returns is long.

In a case where an intermediate device provided between the host and the database can write hit row data strings in the buffer areas in the host through, for example, DMA (Direct Memory Access), the search speed is expected to be improved. In a case where each of n-processes can share at least two or more buffer areas 11 among m-buffer areas, the total buffer capacity is expected to be reduced. In order to allow the intermediate device to write the hit row data strings in the shared buffer areas in the host, the host is required to designate the write destination addresses in the shared buffer areas for the intermediate device.

However, as described above, the amount of data to be found in response to the search query is unknown at the time point when the host issues the search query. Consequently, it is difficult to designate the write destination address appropriate for the intermediate device.

Accordingly, in the database search system (an example of the computer system) where the intermediate device writes the hit row data strings in the buffer areas in the host, n×m buffer areas 11 that each have the same capacity as the search unit volume 12 is required to be allocated to the host.

In the database search system where the intermediate device writes the hit row data items into the buffer areas in the host, none of the buffer areas can be released (for example, swap that saves the data in the buffer area (for example, saves the data into a disk) cannot be performed). This is because writing of the hit row data strings into the buffer areas depends on the intermediate device, and accordingly, each buffer area is required to be resident on the host.

In this embodiment, even with the computer system where the intermediate device writes the hit row data strings into the buffer areas in the host, the number of buffer areas can be less than n×m, more specifically, one buffer area can be allocated to one process and m-requests.

In this embodiment, even with the computer system where the intermediate device writes the hit row data strings into the buffer areas in the host, the buffer areas can be released.

Furthermore, according to this embodiment, even with the computer system where the intermediate device writes the hit row data strings into the buffer areas in the host, the capacity of at least one buffer area can be dynamically changed.

Hereinafter, this Embodiment is described in detail.

Figure 5:
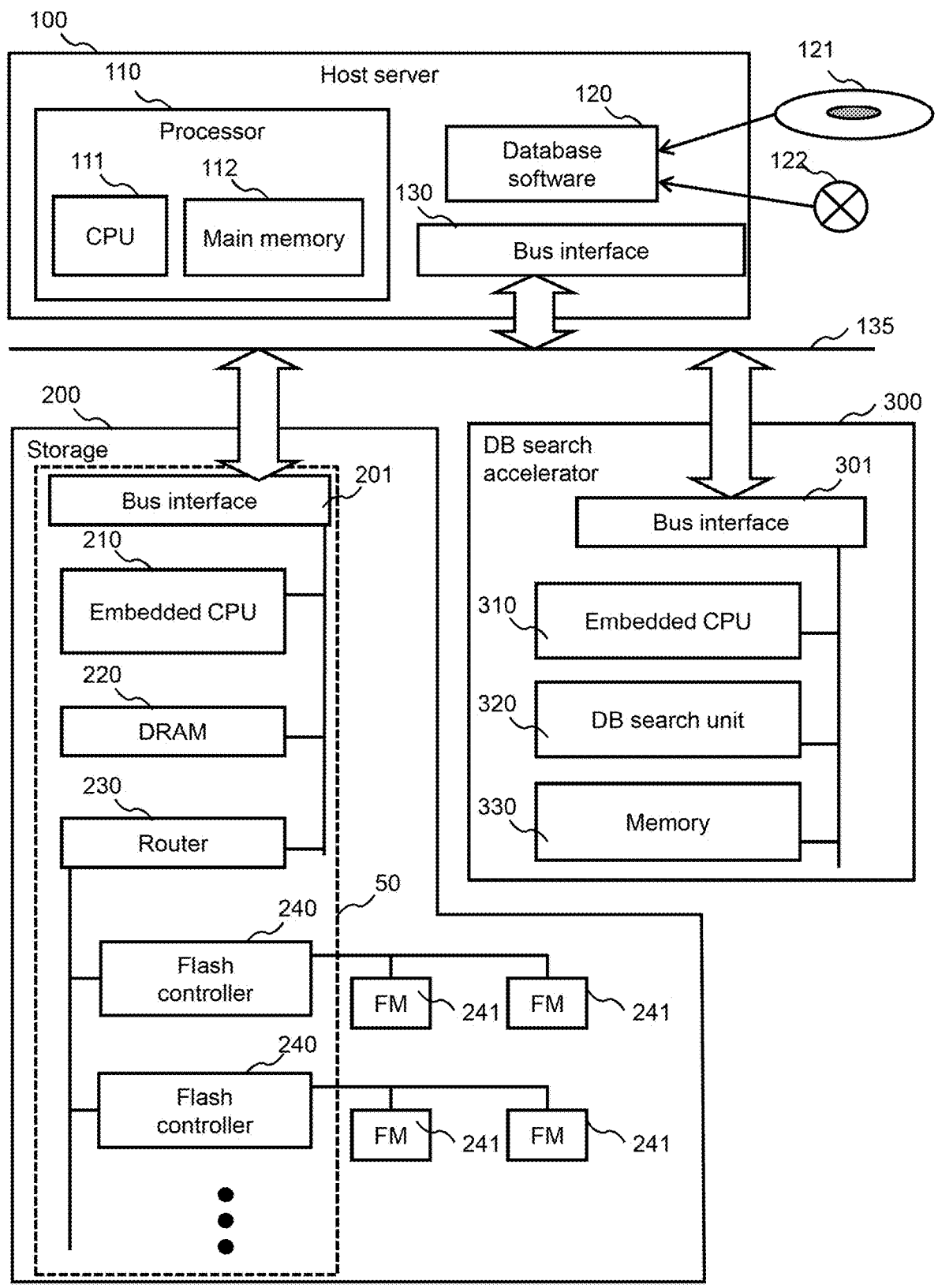
FIG. 5 shows a configuration of a database search system according to Embodiment 1.

FIG. 5 shows a configuration of a database search system according to Embodiment 1.

The database search system includes a host server 100, a storage 200 which is coupled to the host server 100 by a host bus 135, and a DB search accelerator 300 for accelerating database search.

The host server 100 is an example of the host, and may be a General purpose CPU board. The host server 100 includes: a processor 110 whose main configuration elements are CPU 111 and a main memory 112; and a bus interface 130 that controls communication between configuration elements coupled to the host bus 135. The processor 110 includes multiple CPU cores. The multiple CPU cores may reside in a single CPU 111 or in multiple CPUs 111. One process can be executed by one CPU core. The processor 110 executes a database process by executing database software 120 provided via a recording medium 121 and a network 122. The database software 120 may be an example of a computer program, and may be stored in a host memory unit (storage resource) that is at least one memory, not shown. At least a part of the host memory unit may reside in the processor 110.

The main memory 112 may be included in the host memory unit. The database software 120 may be, for example, DBMS (Database Management System).

The storage 200 includes one or more PDEVs (physical storage devices) that stores the database, and a storage controller 50 that controls data input and output into and from the one or more PDEVs.

The PDEV may be an FM (flash memory) 241. Instead of the FM, another type of semiconductor memory element, or a magnetic medium, such as an HDD, may be adopted. One or more RAID (Redundant Array of independent (or Inexpensive) Disks) groups including multiple FMs 241 may be constructed.

The storage controller 50 includes: a bus interface 201 that receives and controls commands supplied through the host bus 135; an embedded CPU 210 that performs storage control; a DRAM 220 that temporarily stores commands and data to be processed by the embedded CPU 210, and data accompanying storage access; a router 230 that constitutes a data transfer path between the bus interface 201 and FMs 241; and a plurality of flash controllers 240 that control data I/O with a plurality of FMs 241. The embedded CPU 210 is coupled to the bus interface 201, the DRAM 220 and the router 230. The embedded CPU 210 transmits a data read or write command to the flash controllers 240 to which the FM 241 serving as the data read source or write destination is coupled. The command is transferred by the router 230 to the flash controllers 240 serving as the destination. The flash controller receives the command, and reads data from the read source FM 241 or writes data into the write destination FM 241 in response to the command.

The DB search accelerator 300 is an example of the intermediate device provided between the host and the database. The DB search accelerator 300 may be realized by adopting FPGA (Field-Programmable Gate Array), ASIC (Application Specific Integrated Circuit) or the like. The DB search accelerator 300 includes: a bus interface 301 coupled to the host bus 135; an embedded CPU 310 that controls and manages the entire process of the DB search accelerator 300; a DB search unit 320 that performs an actual process of searching with a database, and a memory 330 that temporarily stores actual data in the database. The embedded CPU 310 is coupled to the bus interface 301, the DB search unit 302, and the memory 330. Commands and responses are transmitted and received through the bus interface 301. The embedded CPU 310 is an example of one or more processors in a processor unit that includes the one or more processors. The memory 330 is an example of a memory unit that is one or more memories. The memory 330 may be SRAM (Static Random Access Memory), DRAM, etc. The DB search unit 320 is one configuration element (e.g., a hardware circuit) realized by adopting FPGA, ASIC, etc. Alternatively, the DB search unit 320 may be a function realized by the embedded CPU 310 executing software (a computer program).

In this embodiment, communication using the PCIe(PCI-Express) protocol in conformity with the NVMe (Non-Volatile Memory Express) standard is performed between the host server 100 and the DB search accelerator 300, and between the DB search accelerator 300 and the storage 200. The host bus 135 is a PCie bus. The bus interfaces 130, 201 and 301 are each an interface for the sake of communication in conformity with the NVMe standard.

Figure 6:
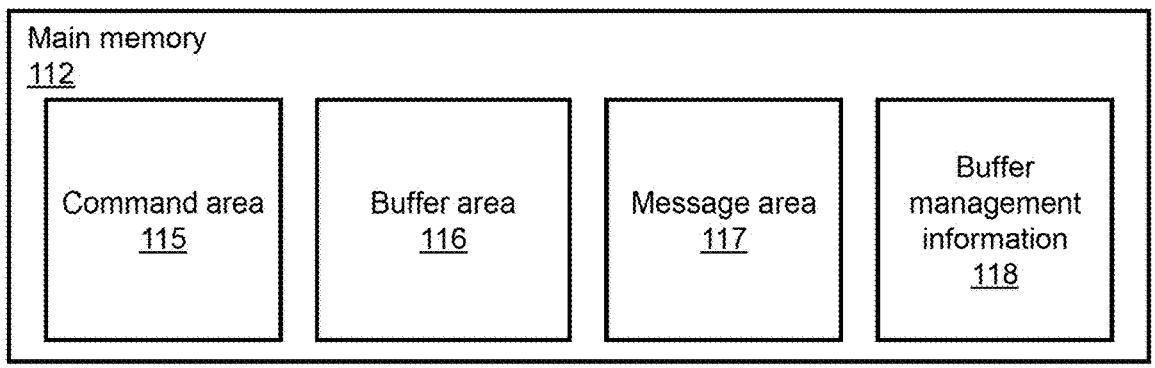
FIG. 6 shows a configuration of a main memory.

FIG. 6 shows a configuration of the main memory 112.

The main memory 112 is provided with a command area 115 that stores a command (e.g., a command, such as a search query indicating the details of the database search process) issued by the host server 100 to the DB search accelerator 300, a buffer area 116 (an example of a temporary area) that stores a data string search-hit in a database search executed by the DB search accelerator 300, and a message area 117 that stores meta information in units of DB processes by the DB search accelerator 300. The main memory 112 stores buffer management information 118 that is information that contains information indicating the writable capacity of the buffer area 116. The command area 115 and the buffer management information 118 are generated by the host server 100 (CPU 111). The DB search accelerator 300 reads the command from the command area 115 and reads at least a part of the buffer management information 118, through DMA (Direct Memory Access). The DB search accelerator 300 writes data into the buffer area 116, and writes a message (e.g., at least a part of meta information) into the message area 117, by DMA. The host server 100 (CPU 111) reads data from the buffer area 116, and reads the message from the message area 117. Reading and writing by DMA may be performed by a DMA control unit (not shown) in the DB search accelerator 300. The DMA control unit may be apart of the embedded CPU 310 or DB search unit 320, or may reside, as an independent module, out of the embedded CPU 310 and the DB search unit 320. At least one of the DMA control unit and the DB search unit 320 may be an element included in a processor unit that includes the embedded CPU 310.

DMA transfer may be adopted as at least one of transmission of a command from the host server 100 to the DB search accelerator 300 and transmission of the response to the command. For example, the host server 100 (database software 120) may store the command in the command area 115 and configure the storing destination address to the DB search accelerator 300, and the DB search accelerator 300 may obtain a command from the storing destination address. The command may be any of an I/O command, an initial configuration command, and a search instruction command.

The commands from the host server 100 to the DB search accelerator 300 include I/O commands (a write command and a read command). In the I/O command, the I/O address (the read source or write destination address (e.g., LBA (Logical Block Address))) and the I/O volume (the volume of I/O target data) are designated. That is, a typical I/O command is an example of a request whose data transfer amount is preliminarily recognized. In a case where the I/O command is the read command, the transfer destination address (the write destination address of read target data according to the read command) is further designated in the I/O command. In a case where the I/O command is the write command, the transfer source address (the read source address of write target data according to the write command) is further designated in the I/O command. The transfer destination address and the transfer source address are each the address of an area (in particular, an area in the buffer area) in the host memory unit (the main memory 112 in this embodiment).

In this embodiment, the initial configuration command and the search instruction command are supported as commands from the host server 100 to the DB search accelerator 300, besides the typical I/O commands, described above. The initial configuration command is an example of a first special command to be issued prior to commands with the m-multiplicity (m commands) corresponding to one process (e.g., one search). The search instruction command is an example of a second special command to be issued per process. The search instruction command is issued with the m-multiplicity per process. The search instruction command is an example of a search request (typically, a search query).

Figure 7:
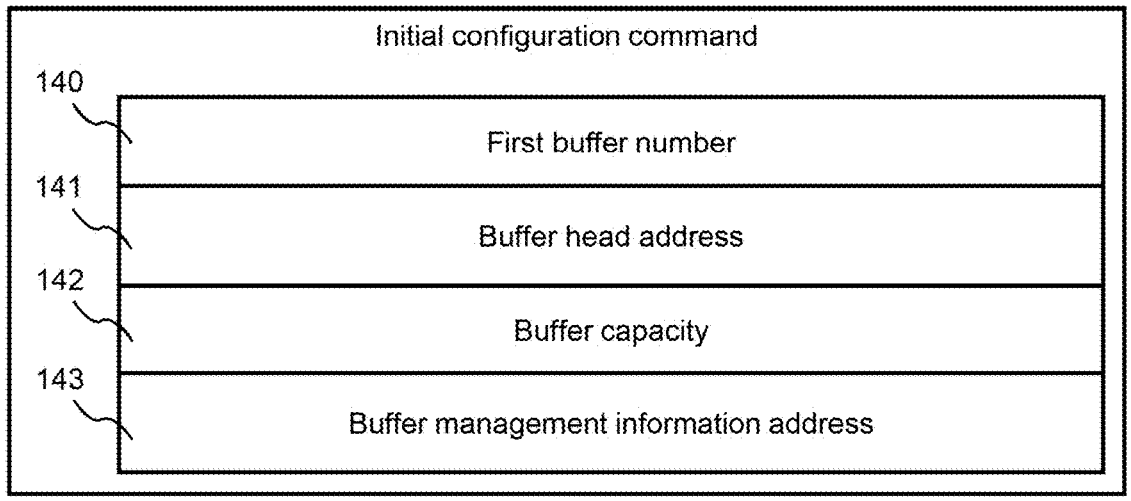
FIG. 7 shows a configuration of an initial configuration command.

FIG. 7 shows the configuration of the initial configuration command.

The initial configuration command contains: a first buffer number 140 that indicates the identification number of the buffer area ("designated buffer area" in this paragraph) 116; a head address 141 that indicates the head address of the designated buffer area 116; a buffer capacity 142 that indicates the capacity of the designated buffer area; and a buffer management information address 143 that indicates the head address of an area that stores the buffer management information 118 that contains information indicating the free capacity of the designated buffer area 116.

Figure 8:
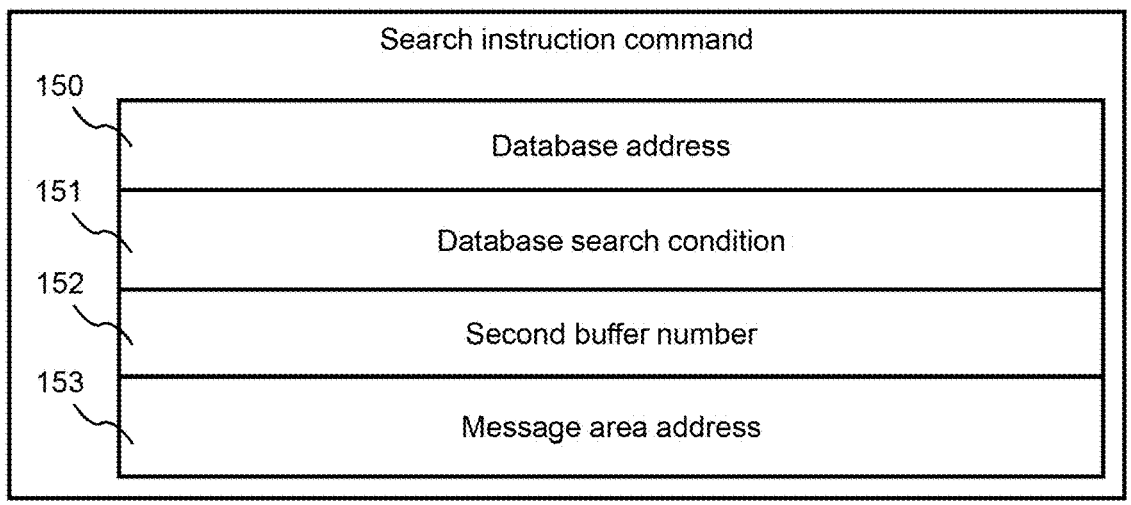
FIG. 8 shows a configuration of a search instruction command.

FIG. 8 shows the configuration of the search instruction command.

The search instruction command contains: a database address 150 that indicates the head address (e.g., LBA) of the search scope of the database; a database search condition 151 that indicates a search condition; a second buffer number 152 that indicates the identification number of the write destination buffer area 116 for search-hit data; and a message area address 153 that indicates the address of the message area 117 that stores meta information pertaining to the search at the time point when the search is finished.

The m search instruction commands in the same process may have different database addresses 150. More specifically, for example, in the same process, the database address 150 of a first search instruction command may designate a search scope with a first 1 GB in the database. The database address 150 of in a second search instruction command may designate a search scope with a next 1 GB. The herein described "1 GB" is the search unit volume.

The pieces of information 141 to 143 contained in the initial configuration command may further be contained in the search instruction command.

The number indicated by the second buffer number 152 is the same as the number indicated by the first buffer number 140 in the initial configuration command transmitted prior to the search instruction command that contains the number 152. That is, the designated buffer area 116 described above is the write destination buffer area 116 for search-hit data.

Figure 9:
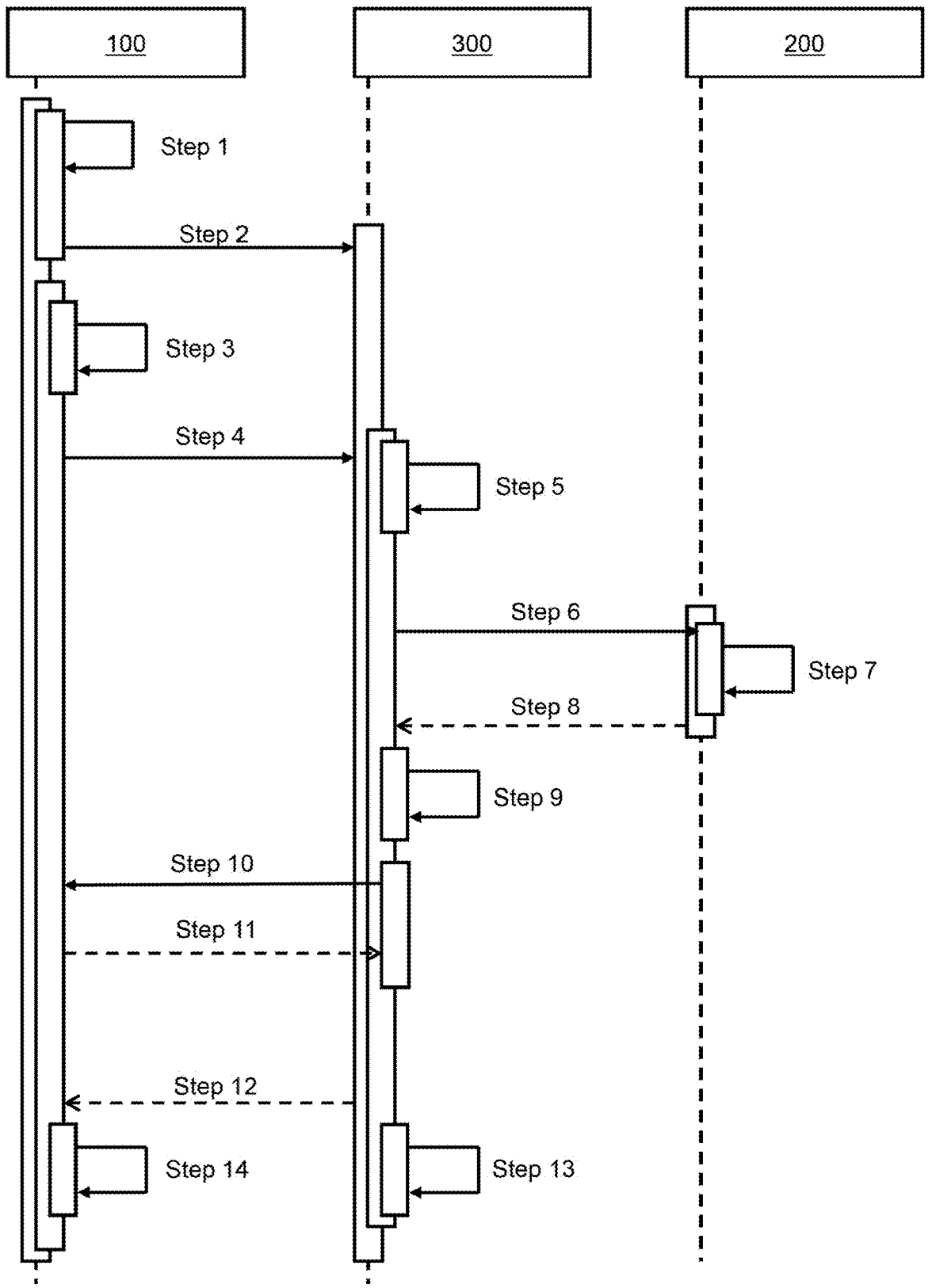
FIG. 9 is a sequence diagram of a database search process.

FIG. 9 is a sequence diagram of the database search process.

This database search process does not comprehensively search all the rows of the database, but divides the entire database into specific search units (DB process units) and processes the units on a pipeline basis. The search unit volume may be determined in consideration of the capacity of the main memory 112 in the host server 100, the process latency of the DB search accelerator 300, etc. For example, it is assumed that the entire volume of the database is 1 TB, and the search unit volume is 1 GB. Accordingly, to search the entire database, the search in conformity with the search unit volume is subjected to 1024 loop processes, thereby allowing the entire database to be searched. In this example, 1024 synchronizations are executed between the host server 100 and the DB search accelerator 300.

When a request for executing database search on the host server 100 is issued, in step 1, the CPU 111 of the host server 100 (database software 120) allocates a command area 115, a buffer area 116, a message area 117, and a buffer management information 118, in the main memory 112. The CPU 111 (database software 120) allocates the identification number to the buffer area 116, and stores, in the buffer management information 118, information that indicates the capacity of the allocated buffer area 116. The capacity of the allocated buffer area 116 (i.e., the initial capacity) may be a predetermined initial value, the same as the search unit volume (e.g., the volume of a first process unit, described later), a volume smaller than the search unit volume, or the volume larger than the search unit volume. The capacity of the buffer area 116 can be dynamically changed as described later.

Next, in step 2, CPU 111 (database software 120) Generates the initial configuration command, and transmits the initial configuration command to the DB search accelerator 300. In the initial configuration command, the first buffer number 140 indicates the identification number of the allocated buffer area 116, the head address 141 indicates the head address of the buffer area 116, and the buffer management information address 143 indicates the head address of the area for the buffer management information 118 that contains the information indicating the capacity of the buffer area 116. This initial configuration command is issued one time per search instruction command that is for one process and has m-multiplicity. The embedded CPU 310 of the DB search accelerator 300 receives the initial configuration command, and initializes the internal state according to the initial configuration command. More specifically, for example, the initialization may include configuring the pieces of information 140 to 143 in the initial configuration command into the memory 330. Here, the address indicated by the head address 141 is set as the write pointer (write destination address) of the buffer area 116 indicated by the first buffer number 140. The embedded CPU 310 issues a response to the host server 100 (database software 120) with completion of the initialization.

Next, in step 3, to activate the DB search accelerator 300 on the first process unit basis, the CPU 111 of the host server 100 (database software 120) executes a preprocess of the first process unit. The preprocess may include, for example, generating the m-multiplicity search instruction command according to the first process unit (search unit volume).

In step 4, the CPU 111 of the host server 100 (database software 120) transmits the m-multiplicity search instruction command to the DB search accelerator 300. Hereinafter, with respect to one search instruction command as an example, steps 5 to 13 are described.

In step 5, the DB search accelerator 300 (embedded CPU 310) receives the search instruction command, and performs a preprocess on a DB process unit basis (second process unit basis) according to the search instruction command. The herein described preprocess may include dividing the first process unit into multiple second process units (i.e., steps 6 to 8 may be performed multiple times for one search instruction command). The second process unit may be smaller than the first process unit. Alternatively, the second process unit may have the same size as the first process unit does. The preprocess may include configuring, in the memory 330, the pieces of information 150 to 153 in the search instruction command.

In step 6, the DB search accelerator 300 (embedded CPU 310) transmits, to the storage 200, a request for reading the entire data belonging to the search scope according to the second process unit. In step 7, according to the read request, the storage 200 (embedded CPU 210) reads, from one or more FMs 241, a data group belonging to the search scope in conformity with the second process unit. In step 8, the storage 200 (embedded CPU 210) returns the read data group to the DB search accelerator 300. The returned data group is stored in the memory 330 by the embedded CPU 310 of the DB search accelerator 300.

In step 9, the DB search accelerator 300 (DB search unit 320) searches the returned data group for data items that satisfy the search condition 151 in the search instruction command.

In steps 10 and 11, the DB search accelerator 300 (embedded CPU 310) confirms the transmission permission in order to confirm the transmission permission of the hit row data string by the host server 100. More specifically, the DB search accelerator 300 (embedded CPU 310) refers to the buffer management information 118 indicated by the address 143 in the initial configuration command (step 10), and identifies the free capacity of the buffer area 116 (step 11).

In a case where the free capacity specified in step 11 is less than the volume of the hit row data string, the DB search accelerator 300 (embedded CPU 310) interrupts writing (transfer) of the hit row data string into the write destination buffer area 116. Until a free capacity equal to or more than the volume of the hit row data string is identified, the DB search accelerator 300 (embedded CPU 310) repeats steps 10 and 11. That is, the DB search accelerator 300 (embedded CPU 310) periodically refers to the capacity information (information that indicates the free capacity in the buffer area) in the buffer management information 118 (polling). This is because the free capacity indicated by the buffer management information 118 can be sometimes increased by the CPU 111 (database software 120) reading data from the buffer area 116.

In a case where the free capacity identified in step 11 is equal to or more than the volume of the hit row data string (in a case where data transfer is determined to be allowed), the DB search accelerator 300 (embedded CPU 310) writes the hit row data string in the area indicated by the write pointer of the write destination buffer area 116 by DMA, for example, and writes the meta information on the hit row data string in the write destination message area 117 (the area indicated by the address 153 in the search instruction command) in step 12. In a case where writing of the hit row data string is interrupted and where it is detected that the identified free capacity is equal to or more than the volume of the hit row data string, the writing of the hit row data string is restarted. The write destination buffer area 116 is an example of the target temporary area, and is the buffer area 116 indicated by the number 152 in the search instruction command. The write pointer is the write destination address indicated by the information set in the memory 330. The meta information written in step 12 contains information that indicates the volume of the hit row data string.

A series of processes in steps 6 to 12 may be made on the basis of a unit smaller than the second process unit instead of the indicated second process unit.

In step 13, the DB search accelerator 300 (embedded CPU 310) executes a postprocess for each second process unit. This postprocess may include a process of updating the write pointer of the write destination buffer area 116 (for example, a process of adding the value corresponding to the volume of the written hit row data string to the current write pointer). The hit row data string according to another search instruction command can be written from the area indicated by the updated write pointer.

In step 14, the host server 100 (database software 120) applies the postprocess of the data search process to the hit row data string written in (transferred to) the write destination buffer area 116 in step 12. This postprocess may include a process of recognizing the updated write pointer of the write destination buffer area 116 on the basis of the volume of the hit row data string written in step 12. This postprocess may include a process of reading from the area indicated by the read pointer (read source address) of the write destination buffer area 116 and updating the read pointer. The free capacity of the write destination buffer area 116 is defined on the basis of the entire capacity of the write destination buffer area 116, the write pointer, and the read pointer. Accordingly, in a case where at least one of the write pointer and the read pointer is updated, the information indicating the updated free capacity (information in the buffer management information 118) may be updated by the host server 100 (database software 120). The update may be included in the postprocess of step 14.

Figure 10:
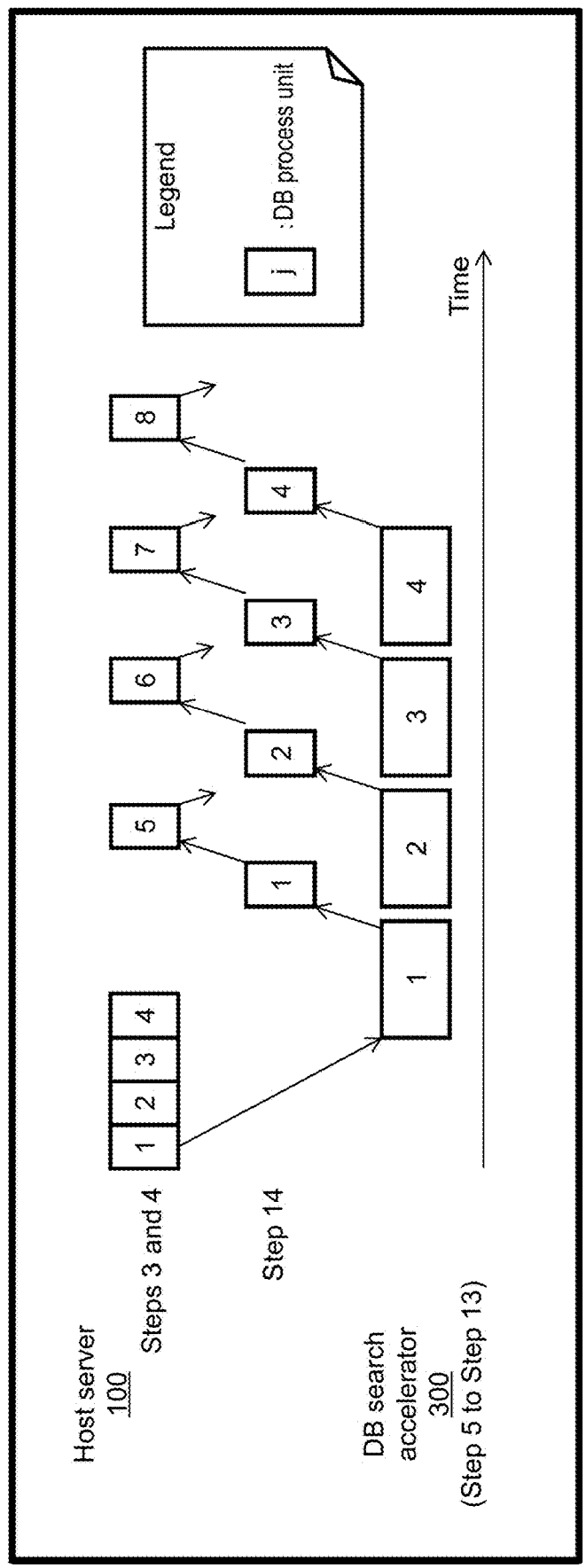
FIG. 10 is a diagram for illustrating multiplicity on a DB process unit basis.

FIG. 10 is a diagram for illustrating multiplicity on a DB process unit basis.

The processes in steps 3 to 14 and the processes in steps 5 to 13 in FIG. 9 are executed on the DB process unit basis in a multiple manner. FIG. 10 indicates a concept in a case where the DB process unit is executed in a quadruple manner.

After issuance of the j-th DB search instruction command, the return of the hit row data string in response to the command is managed in quadruple queues, and the host server 100 and the DB search accelerator 300 operate in a multiple manner on a pipeline basis.

Here, as described in the illustration of FIG. 9, in the transmission permission determination in steps 10 and 11, the DB search accelerator 300 uses the free capacity of the write destination buffer area 16 (the free capacity identified by the buffer management information 118) to interrupt the data transfer of the hit row data string (in a case where the free capacity is less than the volume of the hit row data string) and to restart the data transfer (in a case where the free capacity is equal to or higher than the volume of the hit row data string). The postprocess of step 13 includes updating the write pointer (the information in the DB search accelerator 300) of the write destination buffer area 116. The postprocess of step 14 includes recognizing the write pointer from the volume of the written hit row data string (the hit row data string volume indicated by the information written in the write destination message area 117). The postprocess of step 14 includes updating the information that indicates the free capacity (the free capacity information in the buffer management information 118) on the basis of the recognized write pointer, the read pointer of the write destination buffer area 116, and the capacity of the write destination buffer area 116.

Figure 11:
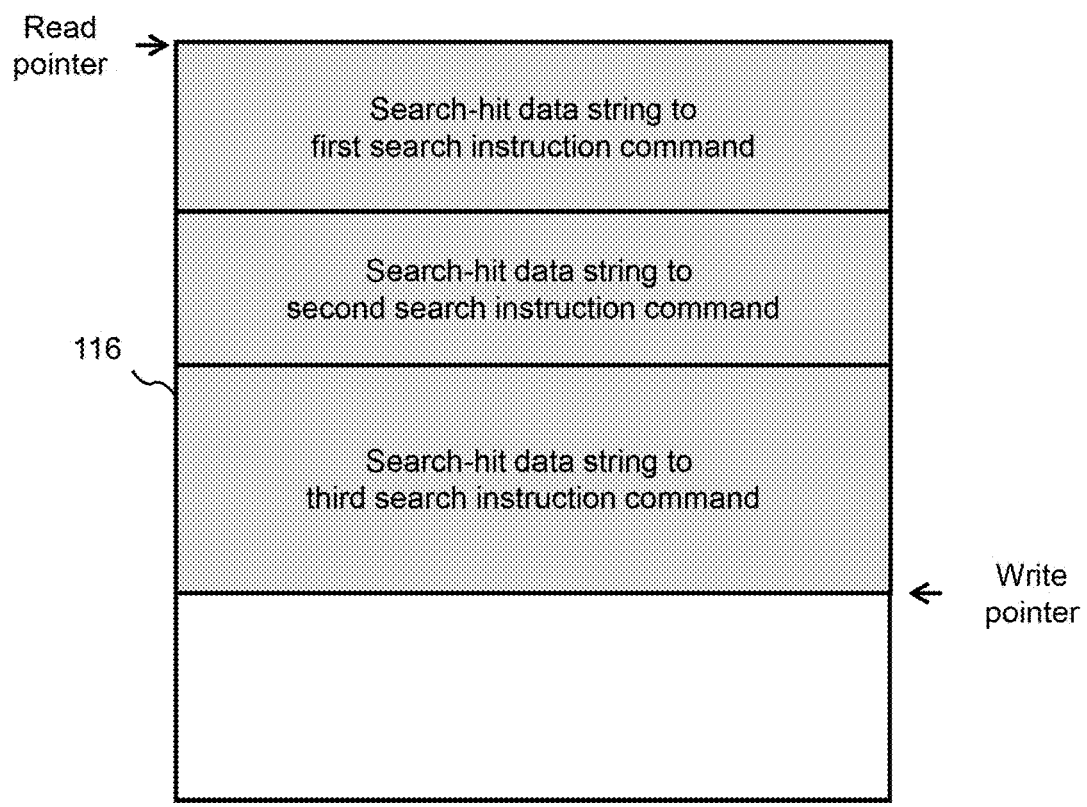
FIG. 11 shows an example of the consecution of multiple hit row data strings in a write destination buffer area.

FIG. 11 shows an example of the consecution of multiple hit row data strings in the write destination buffer area 116.

The write destination buffer area 116 is the identical buffer area 116 shared by different m-search instruction commands for the same process. In the buffer area 116, a plurality of hit row data strings corresponding to the respective search instruction commands are sequentially arranged.

The write pointer of the write destination buffer area 116 is managed and updated by the DB search accelerator 300, thereby allowing the DB search accelerator 300 to write additionally the plurality of hit row data strings corresponding to the respective search instruction commands for the same process in the buffer area 116.

The DB search accelerator 300 (embedded CPU 310) recognizes the free capacity of the write destination buffer area 116, and the DB search accelerator 300 controls interruption and restart of data transfer on the basis of the free capacity, thereby allowing use as a ring buffer (detailed use of the write destination buffer area 116) to be achieved. Each of the read pointer and the write pointer can be moved from the head address to the end address, and can be returned from the end address to the head address, for example.

Figure 13:
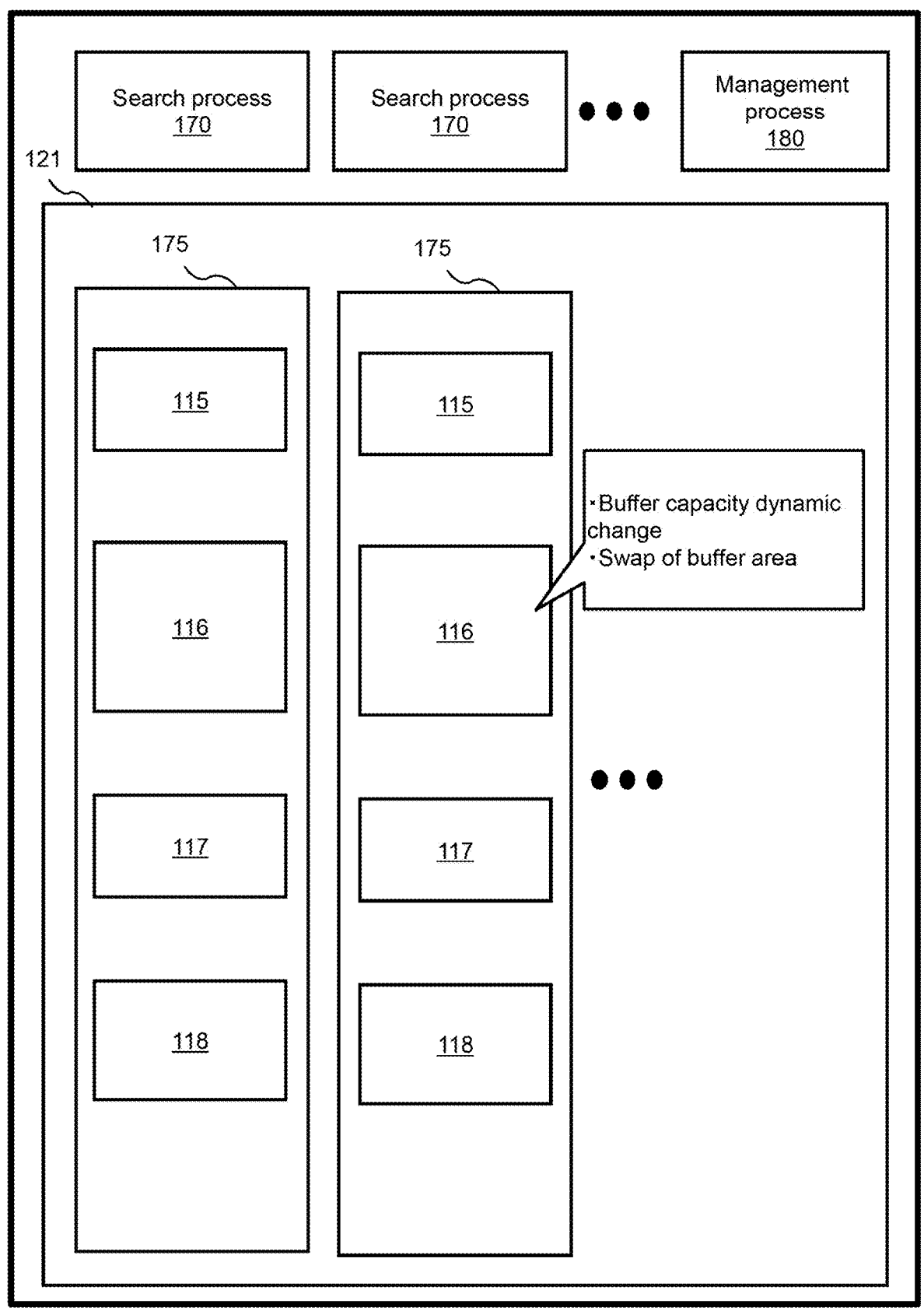
FIG. 13 shows allocation to each of multiple search processes and a management process.

While the areas 115 to 117 and the information 118 are thus shown in FIG. 6, the number of sets of these elements 115 to 118 is one per process. Consequently, as shown in FIG. 13, in the case with multiple processes (hereinafter search processes) 170, the set of elements 115 to 118 is configured in the main memory 112 for each of the search processes 170. More specifically, for example, the host server 100 (database software 120) configures multiple areas 175 corresponding to the respective search processes 170 in the main memory 112. The command area 115 for the search process 170 corresponding to the area 175, the buffer area 116, the message area 117, and the area for the buffer management information 118 are configured in each of the areas 175. The search process 170 is a process for the search process that includes issuance of the search instruction command.

A management process 180 that is a process for managing the multiple buffer areas 116 corresponding to the respective search processes 170 may be executed by the CPU 111. The buffer management for all the search processes 170 is integrated in the management process 180. In this case, the search process 170 can ask the management process 180 about buffer allocation. The search process 170 and the management process 180 are processes realized by the CPU 111 executing the database software 120.

For example, the management process 180 manages the capacities of the buffer areas 116 corresponding to the respective search processes 170 operating in parallel. The main memory 112 has a finite capacity. Consequently, as the search process 170 increases, the buffer area 116 increases accordingly. Therefore, the capacity of the main memory 112 can be compressed. Even in a case with a single search process 170, (e.g., the number of processes n=1), the management process 180 may reside.

The management process 180 can dynamically change the capacity of the buffer area 116 for the search process 170 at the time point of allocation of the buffer area 116 or thereafter. The changed capacity of the buffer area 116 is a required buffer capacity predicted value (the required buffer capacity predicted value) of the search process 170 to which the buffer area 116 is allocated. The management process 180 calculates the required buffer capacity predicted value for the search process 170 on the basis of information that indicates at least one of the following relationships (X) and (Y):

(X) the relationship between the search unit volume (search scope volume) and the buffer capacity; and (Y) the relationship between the search hit rate and the buffer capacity.

The information that indicates the relationship of (X) may be a management table that represents the correspondence relationships between multiple search unit volumes and multiple buffer capacities, or a calculation expression for calculating the buffer capacity using the search unit volume. Likewise, the information that indicates the relationship of (Y) may be a management table that represents the correspondence relationships between multiple search hit rates and multiple buffer capacities, or a calculation expression for calculating the buffer capacity using the search hit rate. According to the information indicated by (X), the larger the search unit volume, the larger the buffer capacity is, and the smaller the search unit volume, the smaller the buffer capacity is. According to the information indicated by (Y), the larger the search hit rate, the larger the buffer capacity is, and the smaller the search hit rate, the smaller the buffer capacity is. The "search hit rate" may be, for example, the ratio of the volume of the hit row data string to the search scope volume. For example, the management process 180 allocates the buffer area 116 having the same capacity as the search unit volume to the search process 170, and subsequently reduces the capacity of the buffer area 116 in a case where the average search hit rate of one or more search instruction commands among m search instruction commands (search instruction commands with m-multiplicity) corresponding to the search process 170 is less than a predetermined value.

In a case where at least (c2) among the following items is satisfied, (c1) the free capacity of the main memory 112 being less than a predetermined value, and (c2) the search process 170 being in an interrupted state (for example, the free capacity of the buffer area 116 corresponding to the search process 170 being less than the volume of the hit row data string), the management process 180 designates the buffer area 116 corresponding to the search process 170 as the swap target. The buffer area 116 designated as the swap target may be swapped out by an OS (Operating System), not shown, in the host server. For example, the data in the buffer area 116, which is a swap target, may be saved in the disk (an example of an auxiliary storage device) in the host server 100, not shown. Subsequently, the buffer area 116 may be removed from the main memory 112.

Embodiment 2

Embodiment 2 is described. In this case, the different points from Embodiment 1 are mainly described. The points common to those in Embodiment 1 are omitted or simplified.

Figure 12:
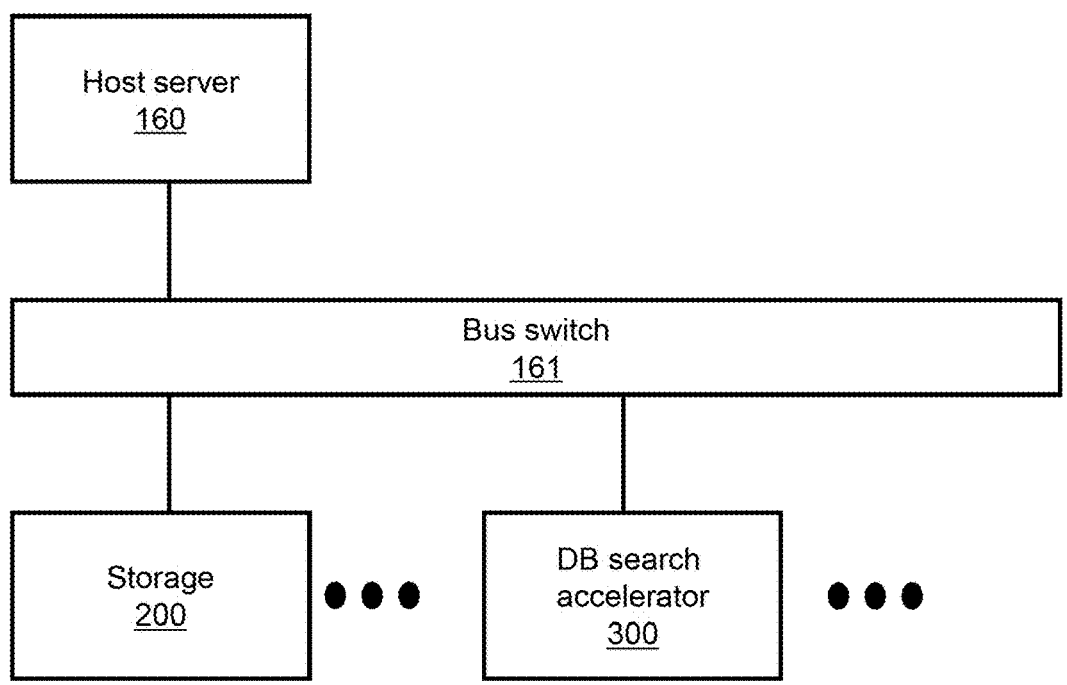
FIG. 12 shows a configuration of a database search system according to Embodiment 2.

FIG. 12 shows a configuration of a database search system according to Embodiment 2.

A host server 160, multiple storages 200, and a plurality of DB search accelerators 300 are coupled to a bus switch 161. Instead of or in addition to the storages 200, PDEVs (e.g., HDDs) may be coupled to the bus switch 161.

Embodiment 3

Embodiment 3 is described. In this case, the different points from Embodiments 1 and 2 are mainly described. The points common to those in Embodiments 1 and 2 are omitted or simplified.

Figure 14:
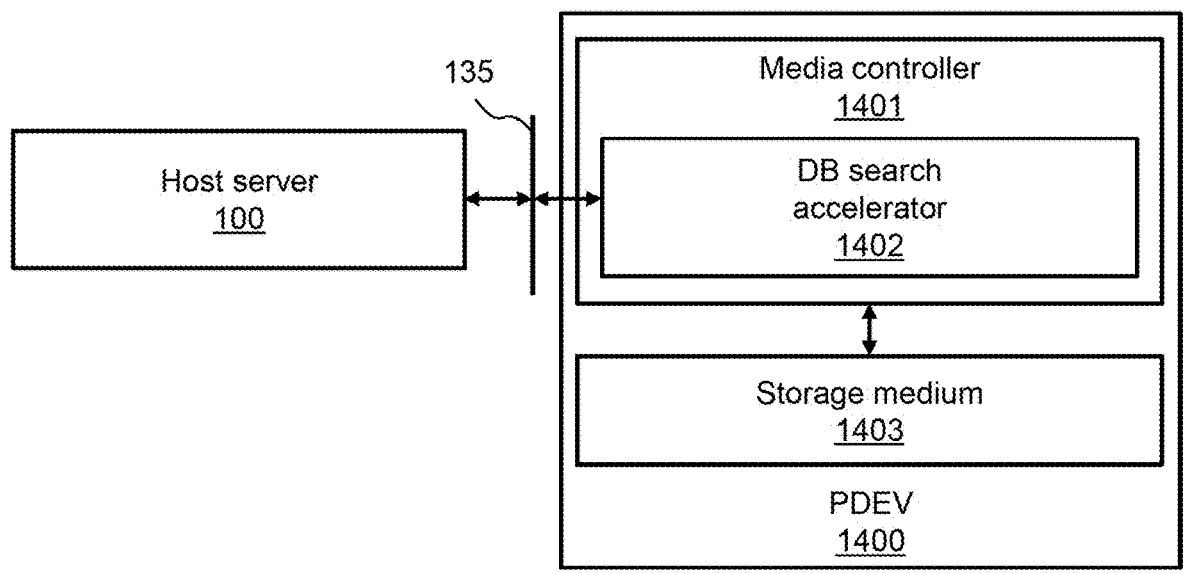
FIG. 14 shows a configuration of a database search system according to Embodiment 3.

FIG. 14 shows a configuration of a database search system according to Embodiment 3.

The host server 100 and a PDEV 1400 are coupled to the host bus 135. The PDEV 1400 includes a storage medium (e.g., a hard disk or a flash memory chip) 1403, and a medium controller 1401 that controls data I/O with the storage medium 1403. The storage medium 1403 stores a database. The medium controller 1401 includes a DB search accelerator 1402. A CPU (not shown) in the DE search accelerator 1402, as the CPU of the medium controller 1401 or through the CPU (not shown) of the medium controller 1401, reads the data group from the database, finds a hit row data string that satisfies the search condition from the data group, and writes the hit row data string into the buffer area in the host server 100.

A typical I/O command may be processed, bypassing the DB search accelerator 1402. The initial configuration command and the search instruction command may be processed by the DB search accelerator 1402.

An example of the intermediate device may be DB search accelerator 1402, or the medium controller 1401.

Embodiment 4

Embodiment 4 is described. In this case, the different points from Embodiments 1 to 3 are mainly described. The points common to those in Embodiments 1 to 3 are omitted or simplified.

Figure 15:
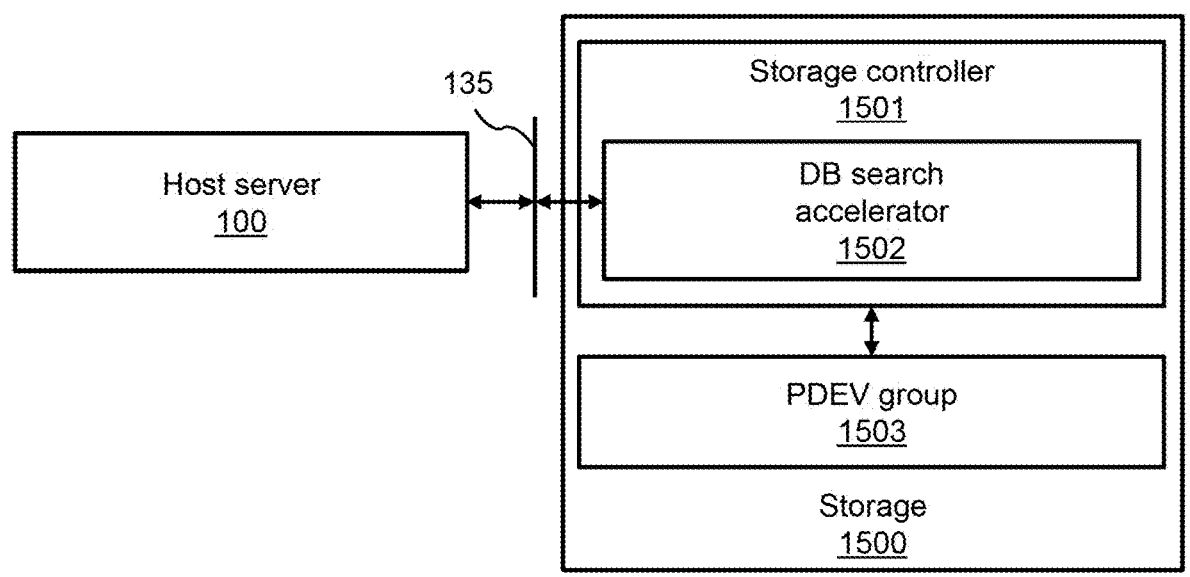
FIG. 15 shows a configuration of a database search system according to Embodiment 4.

FIG. 15 shows a configuration of a database search system according to Embodiment 4.

The host server 100 and storage 1500 are coupled to the host bus 135. The storage 1500 includes a PDEV group (one or more PDEVs (e.g., one or more RAID groups)) 1503, and a storage controller 1501 that controls data I/O with the PDEV group 1503. The PDEV group 1503 stores a database. The storage controller 1501 includes a DB search accelerator 1502. A CPU (not shown) in the DB search accelerator 1502, as the CPU of the storage controller 1501 or through the CPU (not shown) of the storage controller 1501, reads the data group from the database, finds a hit row data string that satisfies the search condition from the data group, and writes the hit row data string into the buffer area in the host server 100.

A typical I/O command may be processed, bypassing the DB search accelerator 1502. The initial configuration command and the search instruction command may be processed by the DB search accelerator 1502.

An example of the intermediate device may be the DB search accelerator 1502, or the storage controller 1501.

Embodiment 5

Embodiment 5 is described. In this case, the different points from Embodiments 1 to 4 are mainly described. The points common to those in Embodiments 1 to 4 are omitted or simplified.

In Embodiments 1 to 4, communication in conformity with the NVMe standard is adopted for communication between the host server and the DB search accelerator. In a case where the command from the host server (command master) is the read command, the transfer destination address is designated by the read command. Consequently, the DB search accelerator (data master) can recognize the transfer destination (storing destination) of the read target data.

In this embodiment, communication between the host server and the DB search accelerator is communication in conformity with the SCSI (Small Computer System Interface) protocol (or FC (Fibre Channel) protocol). Consequently, an interface included in the host server, an interface included in the DB search accelerator, and an interface included in the storage, are the interfaces for SCSI (or FC).

Hereinafter, a multi-master case, and a single master case are described.

<Multi-Master Case>

In the multi-master case, besides the host server, the DB search accelerator serves as an SCSI bus master, and writes the hit row data string into the main memory of the host server. An overview of a sequence of a search process that is performed in the multi-master case is as follows. The sequence is substantially identical to that in Embodiments 1 to 4 (the sequence of a search process in the database search system that performs communication in conformity with the NVMe standard).

That is, the CPU of the host server issues the initial configuration command to the DB search accelerator. The CPU of the host server issues m search instruction commands (search instruction commands with m-multiplicity) to the DB search accelerator. The DB search accelerator writes a hit row data string as a SCSI bus master in the write destination buffer area of the host server for each of the m search instruction commands (since the SCSI bus master recognizes the address of the buffer area, the hit row data string can be directly written). The DB search accelerator writes meta information that represents the volume of the hit row data string and the like in the write destination message area of the host server. The CPU of the host server checks the message area through polling (or interruption).

<Single Master Case>

In a single master case, only the host server serves as the SCSI bus master, and the DB search accelerator does not serve as the SCSI bus master. Consequently, the DB search accelerator cannot recognize the destination of transfer of the hit row data string. In the single master case, the following two flows can be considered.

Figure 16:
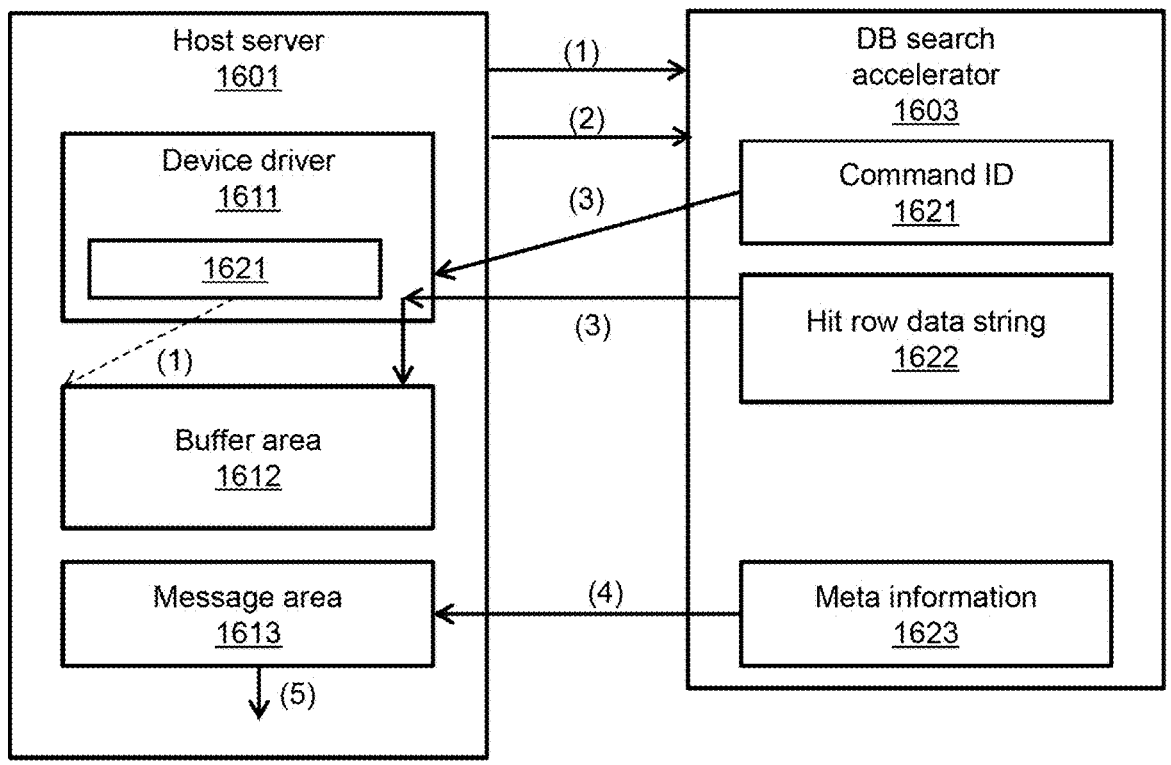
FIG. 16 shows an overview of a first search process according to Embodiment 5 (asynchronous type).

FIG. 16 shows an overview of a first search process (asynchronous type).

(1) A host server 1601 (CPU, not shown) transmits the initial configuration command (see FIG. 7), and the command ID (special command ID) of the initial configuration command to a DB search accelerator 1603. The host server 1601 (CPU) instructs a device driver (SCSI device driver) 1611 of the host server 1601 to associate the command ID and a buffer area 1612 with each other. The DB search accelerator 1603 (an embedded CPU, not shown) stores the received command ID in a memory (not shown) of the DB search accelerator 1603.

(2) The host server 1601 (CPU) transmits the search instruction command (see FIG. 8) to the DB search accelerator 1603. The command ID may be transmitted to the DB search accelerator 1603 at the time point of transmitting the search instruction command (e.g., the first search instruction command) instead of the time point of transmitting the initial configuration command.

(3) The DB search accelerator 1603 (embedded CPU) returns the hit row data string and the command ID to the host server 1601 in response to the search instruction command. The host server 1601 receives the hit row data string and the command ID. The device driver 1611 writes the hit row data string into the buffer area 1612 associated with the command ID. The host server 1601 (the CPU or device driver 1611) manages the write pointer (write destination address) of the buffer area 1612, and updates the write pointer every time the data, such as the hit row data string, is written. The DB search accelerator 1603 does not recognize the write pointer (write destination address) of the buffer area 1612.

(4) The DB search accelerator 1603 (the embedded CPU and DMA control unit) writes meta information that represents the capacity of the hit row data string and the like into the message area 1613 of the host server 1601.

(5) The host server 1601 (CPU) checks the message area 1613 through polling (or interruption).

The overview of the first search process has thus been described above. In (2), as with Embodiments 1 to 4, before returning the hit row data string and the command ID, the DB search accelerator 1603 (embedded CPU) may refer to the buffer management information (not shown) in the host server 1601 and determine whether or not the free capacity of the buffer area 1612 is equal to or more than the volume of the hit row data string. If the determination result is true, the DB search accelerator 1603 (embedded CPU) may return the hit row data string and the command ID.

Figure 17:
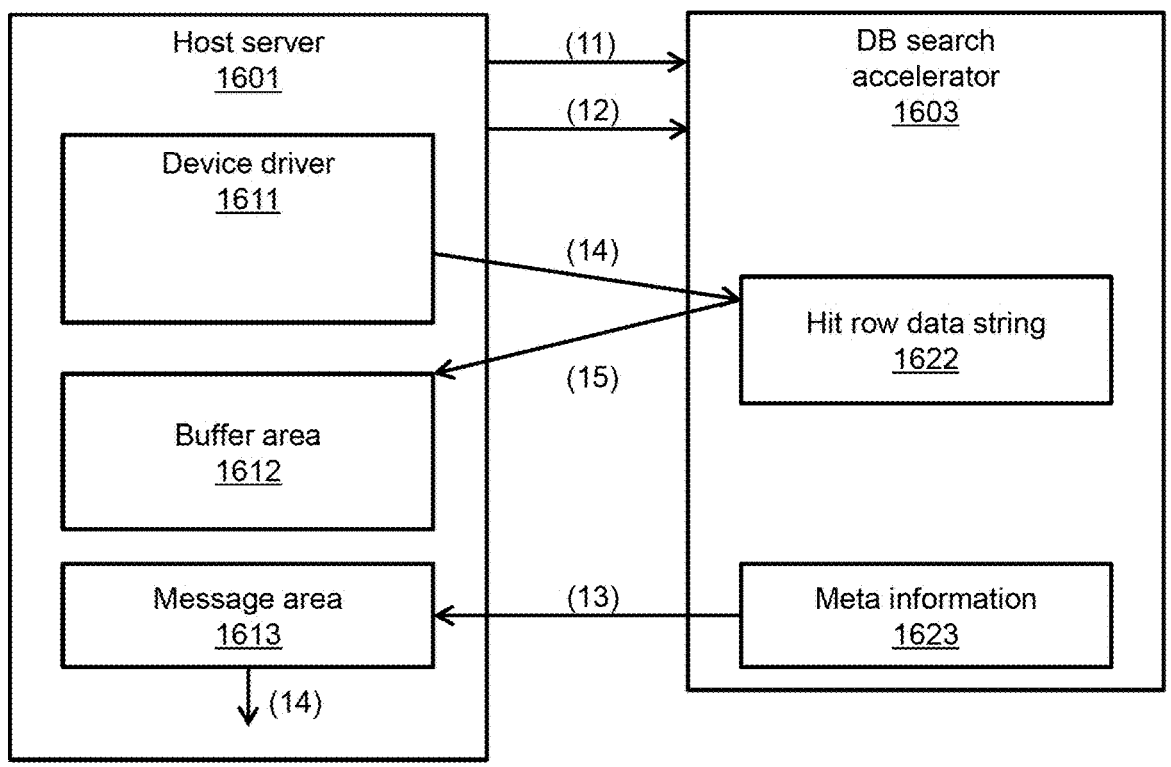
FIG. 17 shows an overview of a second search process according to Embodiment 5 (synchronous type).

FIG. 17 shows an overview of a second search process (synchronous type).

(11) The host server 1601 (CPU) transmits the initial configuration command to the DB search accelerator 1603.

(12) The host server 1601 (CPU) transmits the search instruction command to the DB search accelerator 1603.

(13) The DB search accelerator 1603 (the embedded CPU and the DMA control unit) writes meta information that represents the volume of the hit row data item and the storing address of the hit row data item (the address of the hit row data item in the data group read from the database and stored in the memory) and the like for each hit row data item, into the message area 1613.

(14) The host server 1601 (CPU) checks the message area 1613 through polling (or interruption). In a case where the meta information is stored, the host server 1601 (CPU) recognizes that the search has been finished. When it is recognized that the search has been finished, the host server 1601 (CPU) transmits, to the DB search accelerator 1603, the read command (typical read command) that designates the volume (the volume of the hit row data item) and the storing address (transfer destination address) identified from the meta information, and the write pointer (transfer destination address) of the buffer area 1612. The DB search accelerator 1603 receives the read command.

(15) The DB search accelerator 1603 (the embedded CPU and the DMA control unit) transfers (writes) a data item (hit row data item) having the volume designated by the read command, from the storing address (transfer source address) designated by the read command to the write destination address (transfer destination address) designated by the read command. The host server 1601 (the CPU or device driver 1611) manages the write pointer of the buffer area 1612, and updates the write pointer on the basis of the volume of the hit row data item.

As described above, even in a case where the communication performed in the database search system where the search instruction command whose data transfer amount is unknown to the host is transmitted is communication in conformity with the SCSI protocol, the hit row data string can be additionally written into the buffer area 1612 of the host server 1601. In Embodiment 5, SCSI is exemplified. Alternatively, Embodiment 5 is also applicable to communication in conformity with the FC (Fibre Channel) protocol. The communication in conformity with the SCSI protocol may be applied to a database processing system having the configuration according to any of Embodiments 1 to 4.

The several embodiments have thus been described above. The present invention is not limited to these embodiments, and can be variously changed in a scope without deviating from the gist.

For example, in any embodiment among Embodiments 1 to 4, PCIe may be adopted instead of NVMe. More specifically, for example, the computer system may be an integrated system in which the host server and the storage are integrated. In this system, the communication between the host server and the DB search accelerator, and the communication between the DB search accelerator and the storage may be PCIe communication (for instance, an example of communication in conformity with the same protocol as the protocol of communication in the host server). The DB search accelerator is an end point. Under the rule that the number of root devices residing in one domain is one even in a case where the CPU in the host server and the CPU in the storage are each the root device, the intervention of the DB search accelerator allows communication between the root devices, that is, communication between the CPU in the host server and the CPU in the storage.

For example, the search target is not necessarily limited to the database (in particular, the database that stores structured data). For example, the search target may be a file system, or KVS (Key Value Store). The present invention may also applied to a content search process (in particular, a similarity search process according to the characteristic amount) that is performed for a data mining process (KDD (knowledge-Discovery in Databases) process), for example, a multimedia database (typically, a database that deals with an image and audio in addition to numeric values and text data).

The single common buffer area is provided for the search instruction commands with the m-multiplicity in a single process. The search instruction commands with the m-multiplicity may be some of the search instruction commands with M-multiplicity corresponding to the single process. That is, "m" is two or more and "M" or less.

In Embodiment 5, adoption of any of the multi-master and the single master depends on whether the host bus 135 is the multi-master or the single master. The herein defined "master" means a component that designates the transfer destination address when the command is issued. For example, the SCSI adopts the synchronous type (management is made mainly by the host server). The NVMe adopts the asynchronous type (multiple bus masters can be coupled to each other). More specifically, for example, the description is made as follows.

<Single Master (SCSI): Synchronous Type>

Only the host server recognizes the storing destination address of the read data. In the case of the read command, the host server designates only the command ID to the accelerator. When the read data is returned, the accelerator allocates the command ID that is a target. The host server manages, by itself, the storing destination of the data on the basis of the allocated command ID.

<Multi-Master (NVMe): Asynchronous Type>

Both the host server and the accelerator recognize the storing destination address of the read data. When the data is returned by the accelerator, the accelerator explicitly designates the storing destination address and returns the data.

REFERENCE SIGNS LIST

300 . . . DB search accelerator

The invention claimed is:

1. A search processing system configured to process a search request that is a request involving a data transfer amount unknown to a host that includes a host memory unit that is one or more memories and executes n processes, wherein the n is an integer equal to or more than 1, comprising;
  an intermediate device that is a device provided between the host and a search target, wherein the intermediate device comprises:
    an interface unit that is one or more interfaces coupled to the host; and
    a processor unit that includes one or more processors coupled to the interface unit,
  the interface unit is configured to receive search requests of m-multiplicity, wherein the m is an integer of 2 or more than 2 for at least one process among the n processes,
  each search request of the search requests of m-multiplicity is a request for searching a partial search scope of search targets for hit data items that satisfy a search condition, a target temporary area that is a temporary area associated with the search requests of m-multiplicity is allocated in the host memory unit, for said each search request of the search requests of m-multiplicity, the processor unit is configured to recognize a hit data volume which is a volume of hit data in accordance with the search request within a search scope in accordance with the search request, for said each search request of the search requests of m-multiplicity, the hit data in accordance with the search request is written in an area of the target temporary area that corresponds to a write destination address, and the write destination address is updated for said each search request of the search requests of m-multiplicity, based on the hit data volume recognized by the processor unit, wherein for said each search request of the search requests of m-multiplicity, the processor unit is configured to write the hit data in accordance with the search request into an area in accordance with a write destination address of the target temporary area associated with the search request, for said each search request of the search requests of m-multiplicity, the processor unit is configured to update the write destination address every time the hit data in accordance with the search request is written in the target temporary area, wherein the host memory unit is configured to store temporary area management information that contains information indicating a free capacity of the target temporary area, for said each search request of the search requests of m-multiplicity, the processor unit is configured to: identify a free capacity of the target temporary area by referring to the temporary area management information, interrupt writing of the hit data in accordance with the search request into the target temporary area, in a case where the identified free capacity is less than the hit data volume in accordance with the search request, and write the hit data in accordance with the search request into the target temporary area, in a case where the identified free capacity is equal to or more than the hit data volume in accordance with the search request.

2. The search processing system according to claim 1 wherein a message area that is an area which is associated with the search requests of m-multiplicity and stores meta information is allocated in the host memory unit, each search request of the search requests of m-multiplicity is associated with a message area address that is an address of an area that stores the meta information containing information indicating a volume of the hit data in accordance with the search request and that is an address of the message area, for each search request of the search requests of m-multiplicity, the processor unit is configured to write meta information that contains information indicating a volume of the hit data in accordance with the search request, into an area in accordance with a message area address associated with the search request, and the free capacity represented by the temporary area management information is updated based on the hit data volume indicated by the meta information written in the message area.

3. The search processing system according to claim 1 wherein a management process that is one of the n-processes or another process is executed by the host, in a case where writing of the hit data into the target temporary area is interrupted, the management process designates the target temporary area as a swap target, and the host is configured to swap out the target temporary area designated as the swap target.

4. The search processing system according to claim 1 wherein a management process that is one of the n-processes or another process is executed by the management process, and the management process controls the target temporary area, based on at least one of a volume of a search scope corresponding to the search requests of m-multiplicity and a hit rate of each of one or more search requests among the search requests of m-multiplicity.

5. The search processing system according to claim 1 wherein communication between the host and the intermediate device is communication in conformity with any of Peripheral Component Interconnect express (PCIe), Non-Volatile Memory express (NVMe), and Small Computer System interface (SCSI) (multi-master), and according to the SCSI (multi-master), each of the host and the intermediate device is a master.

6. The search processing system according to claim 1, wherein for the search requests of m-multiplicity, the interface unit is configured to receive an identifier (ID) from the host, for each search request of the search requests of m-multiplicity, the processor unit is configured to return the hit data in accordance with the search request, and an ID of the corresponding ID of the search requests of m-multiplicity, for each search request of the search requests of m-multiplicity, the host is configured to: receive the hit data in accordance with the search request, and the ID; write the hit data into an area according to the write destination address of the target temporary area associated with the ID; and update the write destination address.

7. The search processing system according to claim 6,
wherein communication between the host and the intermediate device is communication in conformity with Small Computer System Interface (SCSI) (single master), and according to the SCSI (single master), only the host between the host and the intermediate device is a master.

8. The search processing system according to claim 1, wherein a message area that is an area which is associated with the search requests of m-multiplicity and stores meta information is allocated in the host memory unit, each search request of the search requests of m-multiplicity is associated with a message area address that is an address of the message area, the address being of an area that stores the meta information pertaining to search according to the search request, for each search request of the search requests of m-multiplicity, the processor unit is configured to: write meta information that contains a volume of the hit data in accordance with the search request, and an address of the area that stores the hit data In accordance with the search request, into an area in accordance with a message area address associated with the search request;

receive, from the host, a read command that designates the write destination address of the target temporary area, and the hit data volume and address indicated by the written meta information; and transfer the hit data from the address indicated by the written meta information to the write destination address in response to the read command.

9. The search processing system according to claim 8, wherein communication between the host and the intermediate device is communication in conformity with Small Computer System Interface (SCSI) (single master), and according to the SCSI (single master), only the host between the host and the intermediate device is a master.

10. The search processing system according to claim 1, further comprising a computer program that generates the n-processes by being executed at least by the host between the intermediate device and the host.

11. The search processing system according to claim 1, further comprising a storage that includes a storing device that stores the search target, wherein the intermediate device is provided in the storage.

12. A search processing method of processing a search request that is a request involving a data transfer amount unknown to a host that includes a host memory unit that is one or more memories and executes n processes, wherein the n is an integer equal to or more than 1, comprising
causing an intermediate device that is a device provided between the host and a search target to receive search requests of m-multiplicity, wherein the m is an integer of 2 or more than 2 for at least one process among the n processes,
wherein each search request of the search requests of the m-multiplicity is a request for searching a partial search scope of search targets for hit data items that satisfy a search condition,
a target temporary area that is a temporary area associated with the search requests of the m-multiplicity is allocated in the host memory unit,
for said each search request of the search requests of the m-multiplicity, the intermediate device recognizes a hit data volume which is a volume of hit data in accordance with the search request within a search scope in accordance with the search request,
for said each search request of the search requests of the m-multiplicity, the hit data in accordance with the search request is written in an area of the target temporary area that corresponds to a write destination address, and
the write destination address is updated for said each search request of the search requests of the m-multiplicity, based on the hit data volume recognized by the intermediate device,
wherein for said each search request of the search requests of the m-multiplicity, writing the hit data in accordance with the search request into an area in accordance with a write destination address of the target temporary area associated with the search request,
for said each search request the search requests of the m-multiplicity, the updating the write destination address every time the hit data in accordance with the search request is written in the target temporary area,
storing temporary area management information that contains information indicating a free capacity of the target temporary area,
for said each search request of the search requests of the m-multiplicity:
identifying, by a processor, a free capacity of the target temporary area by referring to the temporary area management information,
interrupting, by the processor, writing of the hit data in accordance with the search request into the target temporary area, in a case where the identified free capacity is less than the hit data volume in accordance with the search request, and
writing, by the processor, the hit data in accordance with the search request into the target temporary area, in a case where the identified free capacity is equal to or more than the hit data volume in accordance with the search request.

* * * * *